US010186927B2

(12) United States Patent
Randria et al.

(10) Patent No.: US 10,186,927 B2
(45) Date of Patent: Jan. 22, 2019

(54) STATOR COMPRISING AN INTEGRATED RADIATOR

(71) Applicant: ALSTOM TRANSPORT TECHNOLOGIES, Saint-Ouen (FR)

(72) Inventors: Andry Randria, Besancon (FR); Bruno Raguin, Beure (FR); Gérard Tripot, Chenecey-Buillon (FR); Benali Boualem, Saone (FR)

(73) Assignee: Alstom Transport Technologies, Saint-Ouen (FR)

( * ) Notice: Subject to any disclaimer, the term of this patent is extended or adjusted under 35 U.S.C. 154(b) by 243 days.

(21) Appl. No.: 15/167,606

(22) Filed: May 27, 2016

(65) Prior Publication Data

US 2016/0352181 A1 Dec. 1, 2016

(30) Foreign Application Priority Data

May 28, 2015 (FR) ..................................... 15 54825

(51) Int. Cl.
*H02K 5/20* (2006.01)
*H02K 9/06* (2006.01)
(Continued)

(52) U.S. Cl.
CPC ................. *H02K 5/20* (2013.01); *H02K 1/20* (2013.01); *H02K 1/32* (2013.01); *H02K 9/06* (2013.01); *H02K 9/16* (2013.01); *H02K 9/18* (2013.01)

(58) Field of Classification Search
CPC .. H02K 1/20; H02K 1/32; H02K 5/20; H02K 9/06; H02K 9/16; H02K 9/18
(Continued)

(56) References Cited

U.S. PATENT DOCUMENTS

| | | | | |
|---|---|---|---|---|
| 1,681,780 A | | 8/1928 | Pensabene | |
| 5,704,761 A | * | 1/1998 | Kobayashi | F04D 1/006 415/102 |

(Continued)

FOREIGN PATENT DOCUMENTS

| | | |
|---|---|---|
| DE | 925596 C | 3/1955 |
| EP | 1515417 A2 | 3/2005 |

(Continued)

OTHER PUBLICATIONS

Search Report dated Apr. 15, 2016 in corresponding FR Application No. 1554825.

*Primary Examiner* — Alex W Mok
(74) *Attorney, Agent, or Firm* — Knobbe, Martens, Olson & Bear, LLP

(57) ABSTRACT

This electric motor includes a frame defining an internal volume and comprising a rotor and a stator, a primary cooling circuit comprising at least one primary conduit and in fluidic communication with the outside of the frame for circulating a gas stemming from the outside of the frame in the internal volume of the frame, a secondary cooling circuit extending in the internal volume of the frame and isolated from the outside of the frame, said secondary cooling circuit comprising at least one first cooling channel going through the rotor and at least one second cooling channel going through the stator, wherein it comprises at least one heat insulation channel interposed between the primary conduit of the primary cooling circuit and the second cooling channel of the secondary cooling circuit.

10 Claims, 3 Drawing Sheets

(51) Int. Cl.

| | |
|---|---|
| ***H02K 1/20*** | (2006.01) |
| ***H02K 1/32*** | (2006.01) |
| ***H02K 9/16*** | (2006.01) |
| ***H02K 9/18*** | (2006.01) |

(58) Field of Classification Search
USPC .............................................................. 310/59
See application file for complete search history.

(56) References Cited

U.S. PATENT DOCUMENTS

| | | | | |
|---|---|---|---|---|
| 8,519,580 B2 * | 8/2013 | Brandi | ..................... | H02K 9/16 310/57 |
| 8,704,414 B2 * | 4/2014 | Rai | .......................... | H02K 1/32 310/60 A |
| 2011/0140550 A1 * | 6/2011 | Brandl | ..................... | H02K 5/20 310/57 |

FOREIGN PATENT DOCUMENTS

| | | | | |
|---|---|---|---|---|
| EP | 2800251 A1 | 11/2014 | | |
| WO | WO 2013004559 A3 * | 9/2013 | ............... | H02K 1/32 |

* cited by examiner

STATOR COMPRISING AN INTEGRATED RADIATOR

The present invention relates to an electric motor, including a primary cooling circuit for cooling a stator and a secondary cooling circuit for cooling a rotor.

Usually the primary cooling circuit is in fluidic communication with the outside of the frame of the motor so as to allow cooling of the stator by having ambient air circulate in the primary cooling circuit. Generally, the secondary circuit, as for it, is not in fluidic communication with the outside of the frame of the electric motor in order to avoid that dusts or other materials jam or foul the mobile portion of the motor. Consequently, the secondary cooling circuit includes a first cooling channel going through the rotor in which a cold gas fluid circulates for cooling the rotor by heat exchange. The gas fluid in the first cooling channel is heated up and is sent to a second cooling channel going through a body of the stator laid out for again cooling the gas fluid inside the secondary cooling circuit. This second cooling channel is generally integrated into a stack of metal sheets forming the stator, so as to cross the metal sheets in the stacking direction.

Such an electric motor is for example described in document EP 2 308 150.

However the architecture of such an electric motor does not give entire satisfaction. Indeed, the primary cooling channel of the primary cooling circuit, thermally influences the secondary cooling circuit because of heat exchanges between this primary cooling channel containing a hot gas fluid and the secondary cooling circuit.

The efficiency of the secondary cooling circuit is therefore lowered and the motor risks overheating when the motor operates at high power.

One of the objects of the invention is to propose an electric motor comprising cooling circuits allowing effective and simple cooling of the stator and of the rotor of the electric motor.

For this purpose, the object of the invention is an electric motor, including a frame defining an internal volume and comprising:

a rotor and a stator positioned in the internal volume of the frame, a primary cooling circuit comprising at least one primary conduit going through the internal volume of the frame and in fluidic communication with the outside of the frame for circulating a gas stemming from the outside of the frame in the internal volume of the frame, a secondary cooling circuit extending in the internal volume of the frame and isolated from outside of the frame, said secondary cooling circuit comprising at least one first cooling channel going through the rotor and at least on second cooling channel going through the stator, characterized in that it comprises:

at least one heat insulation channel interposed between the primary conduit of the primary cooling circuit and the second cooling channel of the secondary cooling circuit.

The advantages of such an electric motor are multiple and are summarized in a non-exhaustive way below.

The heat insulation channel gives the possibility of forming a heat barrier for the secondary cooling circuit allowing the latter to cool the rotor of the electric motor efficiently, which gives the possibility of increasing the lifetime of the motor and/or of operating it a higher power. Indeed, by means of the heat insulation channel, the heat exchanges between the second cooling channel of the secondary cooling circuit and the primary cooling circuit are greatly reduced, or even suppressed, which gives the possibility of not heating the air circulating in the primary cooling circuit. The efficiency of the cooling of the secondary cooling circuit is there increased.

Advantageously, an electric motor according to the invention may include one or several of the following features, taken alone or according to all the technically conceivable combinations:

- the heat insulation channel belongs to the primary cooling circuit;
- the heat insulation channel belongs to the inner secondary cooling circuit;
- the heat insulation channel at least partly surrounds at least the second cooling channel of the inner secondary cooling circuit;
- the heat insulation channel is laid out as a blade and has a thickness perpendicular to the axis of rotation X-X' smaller than the diameter of the primary conduit of the primary cooling circuit and than the diameter of the second cooling channel of the secondary cooling circuit;
- a radial fan is mounted on the shaft of the motor for accelerating a gas flow in the secondary cooling circuit;
- the radial fan gives the possibility of simultaneously accelerating a gas flow in the primary cooling circuit and a gas flow in the secondary cooling circuit;
- the primary cooling circuit communicating with the outside includes several primary cooling conduits positioned at the periphery of the stator;
- the secondary cooling circuit comprises several second cooling channels, said second cooling channels being grouped into at least one peripheral portion between the edge of the stator and the primary circuit communicating with the outside; and
- the primary cooling circuit and the secondary cooling circuit comprise a plurality of channels.

The invention will be better understood upon reading the description which follows, only given as an example and made with reference to the drawings wherein.

Figure 2:
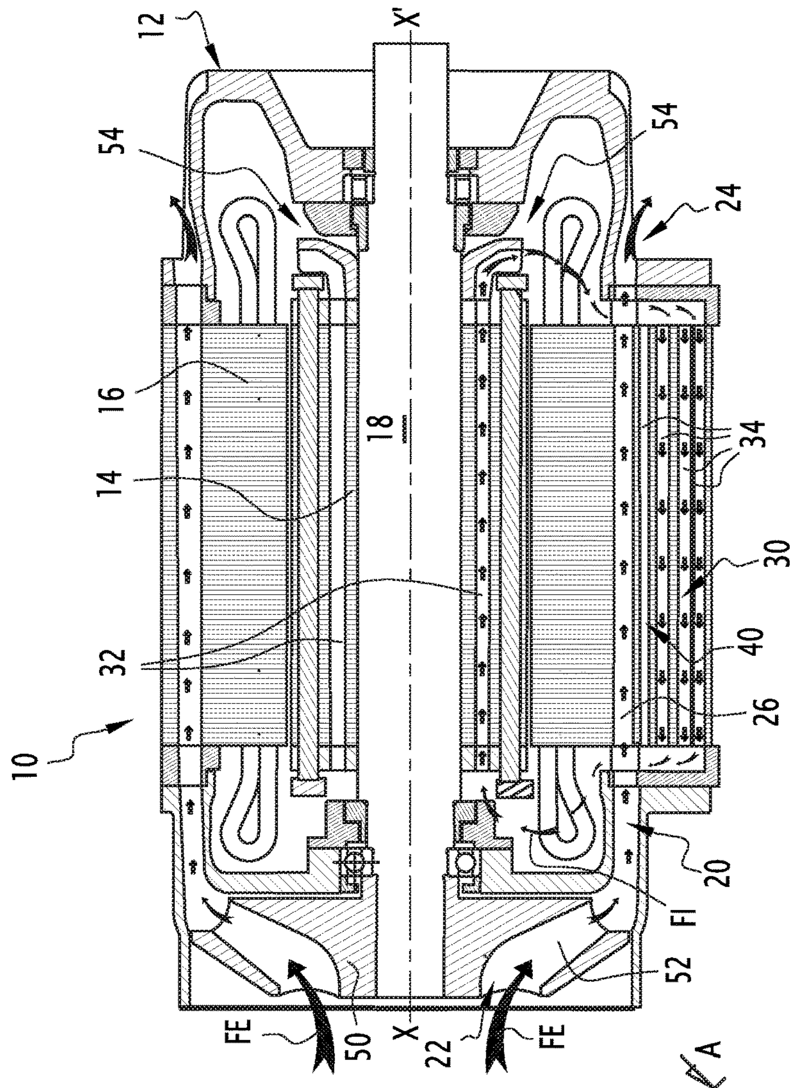
FIG. 2 is a sectional view, along a plane A-A of the electric motor of FIG. 1.
Figure 1:
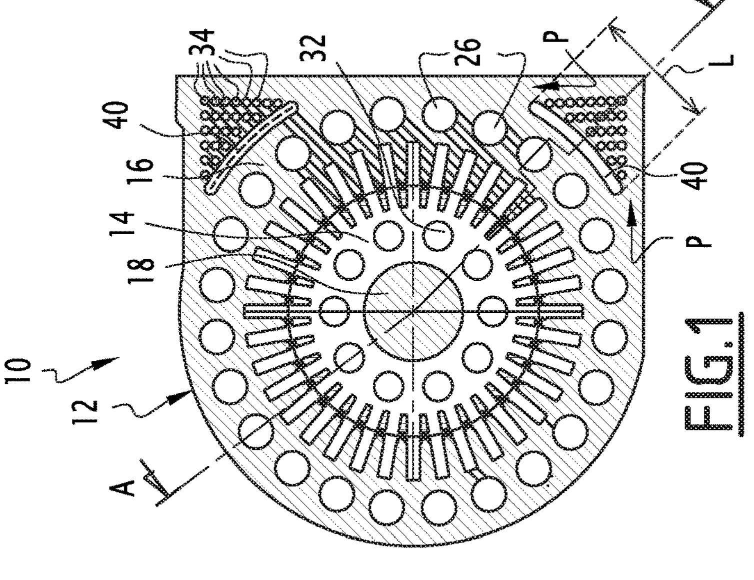
FIG. 1 is an axial sectional view along an axis of rotation X-X' of an electric motor according to the invention.

An electric motor 10 according to a first embodiment of the invention is illustrated in FIGS. 1 and 2. The electric motor 10 comprises a frame 12 defining an internal volume of the motor 10 in which are housed a rotor 14 and a stator 16. The rotor 14 is mounted so as to be secured in rotation on a rotary shaft 18 inside the frame 12 and mounted so as to be mobile in rotation around an axis of rotation X-X' with respect to the stator 16. The stator 16 surrounds the rotor 14 parallel to the axis of rotation X-X' inside the frame 12. Conventionally, the rotor 14 and the stator 16 give the possibility of transforming electric energy into a mechanical energy delivered by the shaft 18 of the rotor 14.

Conventionally, the body of the stator 16 is formed by stacked iron-silicon metal sheets along an axial direction defined by the axis of rotation X-X'. The stator 16 also includes copper coils.

According to an embodiment, a primary cooling circuit 20 includes a primary inlet 22 and a primary outlet 24, each being in fluidic communication with the outside of the frame. By this, is meant that the ambient air is able to penetrate into the primary cooling circuit 20 through the primary inlet 22 and to return to the outside through the primary outlet 24. The primary inlet 22 and the primary outlet 24 are connected with each other through at least one primary conduit 26 going through the stator 16 and for example extending along an axis substantially parallel to the axis of rotation X-X'.

The primary cooling circuit 20, illustrated in FIG. 2, gives the possibility to a gas fluid, i.e. ambient air, stemming from the outside of the frame 12 of flowing into the primary inlet 22. The external gas flow FE is guided by the primary cooling circuit 20 through the internal volume of the frame 12 and more particularly through the stator 16 in order to cool the latter. The primary conduit 26 actually allows heat exchange between the external gas fluid FE and the stator 16. The primary outlet 24 finally gives the possibility of discharging the heated-up external gas fluid FE towards the outside of the frame 12. Thus, the frame 12 and the stator 16 are cooled by ambient air from the environment of the motor.

In the present description, the terms of "upstream" and "downstream" are defined with respect to the direction of circulation of a flow of gas fluid in the motor 10.

A secondary cooling circuit 30, illustrated in FIG. 2, comprises at least one first cooling channel 32, going through the rotor 14. The first cooling channel 32 extends parallel to the axis of rotation X-X', and thus forms at least one aperture through the rotor 14.

The first cooling channel 32 of the secondary cooling circuit 30 allows heat exchange between an inner gas fluid Fl circulating inside the secondary cooling circuit 30 and the structure of the rotor 4.

The secondary cooling circuit 30 is isolated from the primary cooling circuit 20, i.e. there is no fluidic communication between the primary cooling circuit and the secondary cooling circuit. The inner gas fluid Fl fills the secondary cooling circuit 30. This gas fluid, for example air, is isolated from ambient air since there is no fluidic communication between the secondary cooling circuit and the outside of the frame 12.

The secondary cooling circuit 30 includes at least one second cooling channel 34 extending parallel to the axis of rotation X-X' in the body forming the stator 16. This second cooling channel 34 is close to the edge of the frame 12 of the motor 10 or extends outside the frame, in order to generate a heat exchange between the inner gas fluid and the ambient air outside the frame 12. The body of the stator 16 generally includes rectangular edges, as shown in FIG. 1, so that the motor has a size substantially identical with a motor without any secondary cooling circuit 30.

The second cooling channel 34 is connected at its ends through radial passages to the ends of the first cooling channel 32 going through the rotor 14, so that the first cooling channel 32 and the second cooling channel 34 form a closed circuit and are in fluidic communication.

The shaft 18 of the rotor 14 is equipped with a fan 50 including at least two secondary blades 54 capable of generating with the inner gas fluid Fl a secondary gas flow, circulating in the secondary cooling circuit 30. The secondary blades 54 are for example located upstream from the second cooling channel 34 going through the stator 16 and downstream from the first cooling channel 32 going through the rotor 14.

Figure 4:
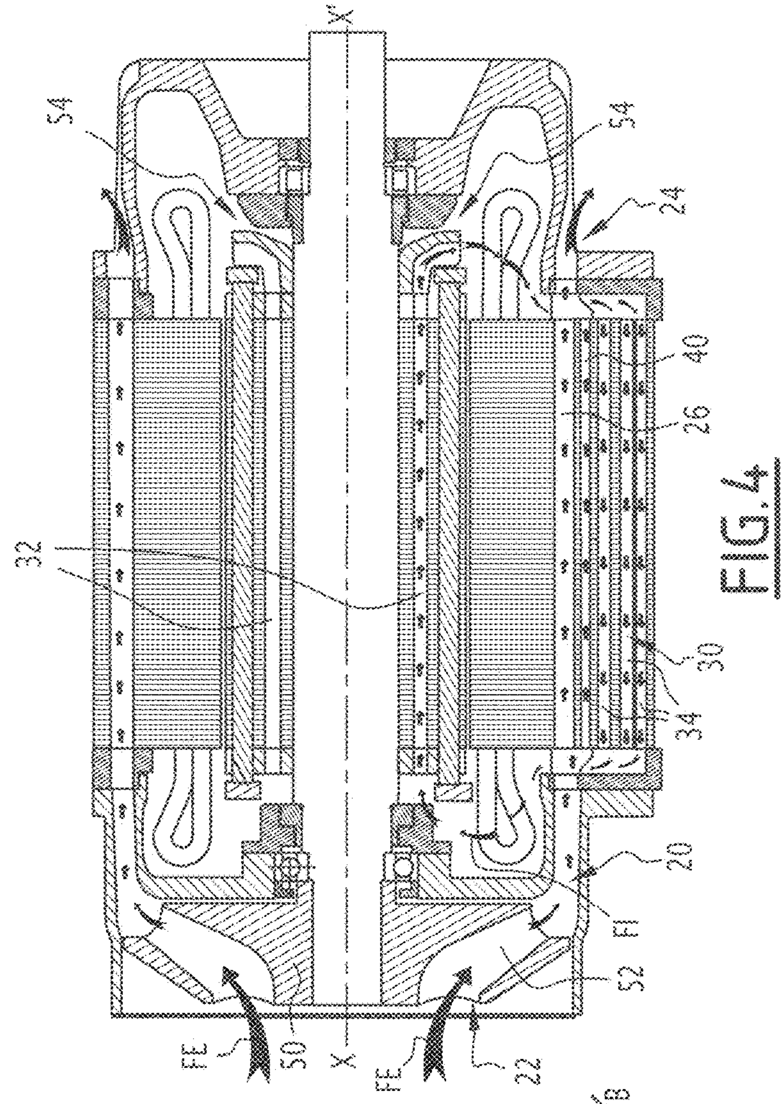
FIG. 4 is a sectional view, along a plane B-B of FIG. 3 of a second exemplary embodiment of the invention.

The shaft 18 of the rotor 14 bears the fan 50 for example on one of its two ends, as this is illustrated in FIGS. 2 and 4. In this case, the fan 50 is located on the outside of the frame 12 of the motor 10.

The primary conduit 26 of the primary cooling circuit 20 and the second cooling channel 34 of the secondary cooling circuit 30 pass through the body of the stator 16 which thus forms a radiator for discharging the heat energy of the motor 10. This integration of the radiator into the stator 16 allows reduction in the total volume of the motor 10, as compared with conventional electric motors, in which an additional radiator extending outside the frame 12 is generally provided for discharging the heat energy from the secondary cooling circuit 30.

Figure 5:
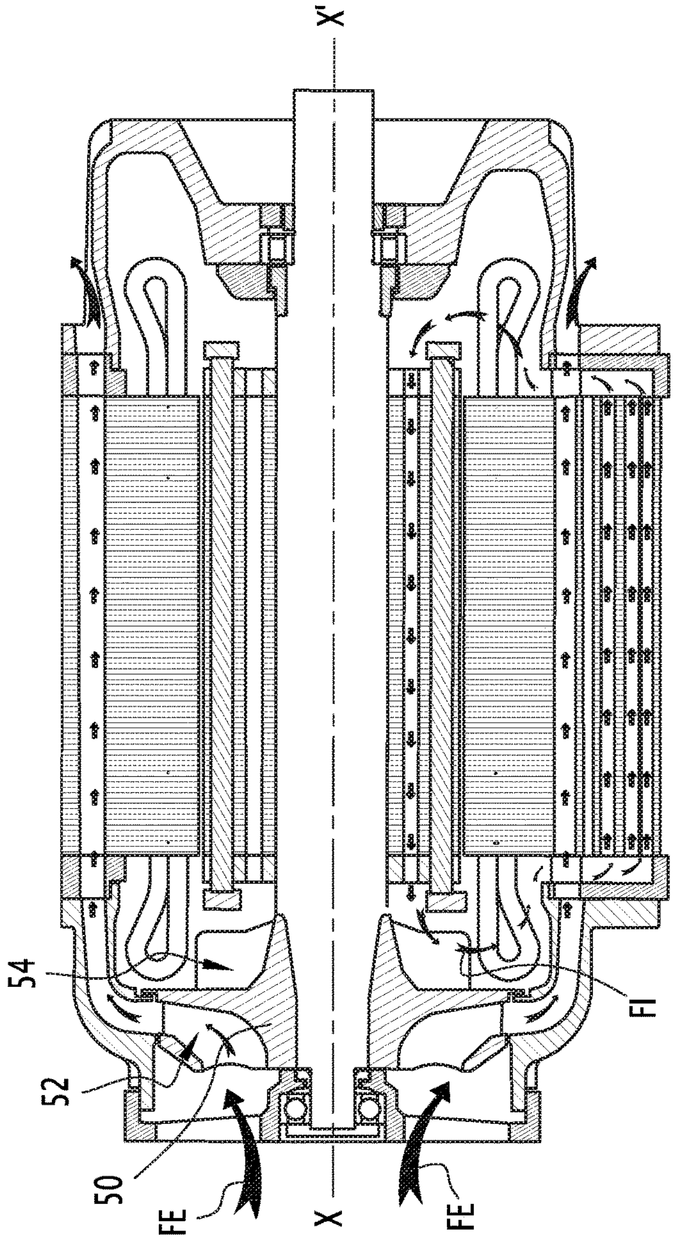
FIG. 5 is an axial sectional view along the axis of rotation of an electric motor according to a fourth exemplary embodiment of the invention.

In an alternative, the fan 50 may be located at least partly inside the frame 12 of the motor 10, as this is illustrated in FIG. 5. In this case, the fan 50 is a radial fan with a portion inside the frame 12 of the motor 10. Thus, an inner gas flow is generated leading the inner gas fluid Fl from the first cooling channel 32 of the secondary cooling circuit 30 to the second cooling channel 34 of the secondary cooling circuit 30, and from the second cooling channel 34 to the first cooling channel 32. Thus, the inner gas fluid Fl stemming from the second cooling channel 34 is heated-up in the first cooling channel 32 going through the rotor 14 during heat exchange with the rotor 4, which has the effect of cooling the rotor, and is again cooled upon its passing through at least one second cooling channel 34 going through the stator 16 to the edge or to the outside of the frame 12 of the motor 10 and then returns to the first cooling channel 32.

The fan 50 also includes at least one primary blade 52 capable of generating a primary gas flow intended to circulate in the primary cooling circuit 20. The primary blade 52 is for example located downstream from the primary inlet 22 and upstream from the primary conduit 26 of the primary cooling circuit 20. Thus, the fan 50 gives the possibility of simultaneously generating a gas flow in the primary cooling circuit 20 and a gas flow in the secondary cooling circuit 30.

According to the invention, the primary conduit 26 of the primary cooling circuit 20 is adjacent to a heat insulation channel 40 interposed between the primary conduit 26 and the second cooling channel 34 in order to form a heat barrier between the primary conduit 26 and the second cooling channel 34.

According to an embodiment, and as this is visible in FIG. 2, the insulation channel 40 belongs to the secondary cooling circuit 30, i.e. it is not in fluidic communication with the second cooling channel 34 of the secondary cooling circuit. This allows that the heat insulation channel 40 be crossed by the cooled inner gas fluid Fl for increasing the heat barrier effect of the heat insulation channel 40.

By interposing the heat insulation channel between the primary conduit 26 and the second cooling channel 34, the heat exchanges between the second cooling channel 34 and the primary conduit 26 are therefore blocked.

According to the described embodiment, and visible in FIG. 1, the heat insulation channel 40 includes a blade-shaped section with a thickness measured perpendicularly to the axis of rotation X-X' for example substantially comprised between 2 and 10 mm. This thickness of the heat insulation channel 40 is less than the diameter of the primary conduit 26 of the cooling circuit 20 and than the diameter of the second cooling channel 34 of the cooling circuit 30 in order not to increase the size of the motor.

The heat insulation channel 40 has a width L allowing isolation of the second cooling channel 34 of the primary conduit 26 at least in one radial direction defined between the shaft 18 and the second cooling channel 34.

The heat insulation channel 40 extends along a line substantially parallel to the axis of rotation X-X' and has a length substantially comprised between 100 and 500 mm.

The heat insulation channel 40 defines at least one point P mechanically connected to the second cooling channel 34 with the frame 12 of the motor 10.

The bridge P is advantageously as thin as possible, and for example has a thickness comprised between 3 and 5 mm. Thus, the heat conduction through the bridge P is minimized.

Figure 3:
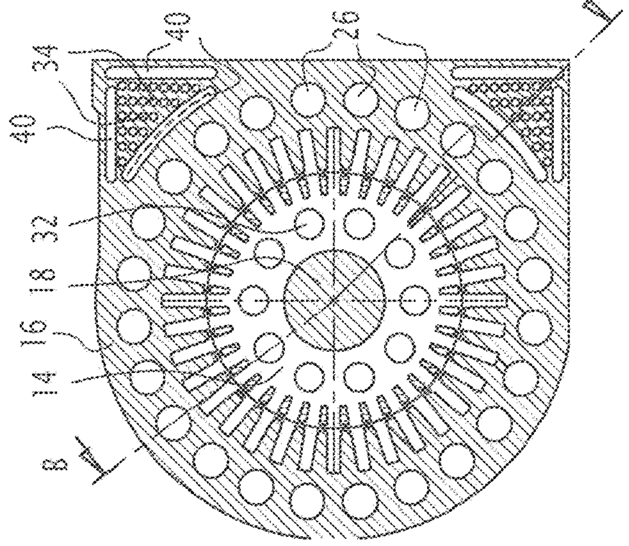
FIG. 3 is a sectional view, along a plane transverse to the axis of rotation of a third exemplary embodiment of the invention.

FIGS. 3 and 4 show a second embodiment, wherein the heat insulation channel 40 is part of the primary cooling circuit 20, i.e. that the heat insulation channel 40 is in fluidic communication with the primary conduit 26 of the primary cooling circuit. In this case, the outer gas fluid, i.e. air, going through the primary conduit 26 of the primary cooling circuit 20 also passes through the heat insulation channel 40 and thus allows a particularly efficient heat insulation. Thus, the temperature in the heat insulation channel 40 of the primary cooling circuit 20 is always less than the temperature in the second cooling channel 34 of the secondary cooling circuit 30, in order to form an efficient heat barrier between both of these circuits. The second cooling channel 34 of the secondary cooling circuit 30 is therefore protected from the heat energy of the primary cooling circuit 20 by the heat insulation channel 40.

In an embodiment, the primary cooling circuit 20 includes several primary conduits 26 positioned at the periphery of the stator 16. Thus the cooling of the stator 16 by the primary conduits 26 is further increased.

In an alternative embodiment, at least one heat insulation channel 40 of the primary cooling circuit 20 surrounds at least partly at least one second cooling channel 34 of the secondary cooling circuit 30. Thus, the heat energy transmitted from the second cooling channel 34 is mainly received by the heat insulation channel 40. This heat energy may be discharged by the gas flow flowing through the heat insulation channel 40 through the primary outlet 24 towards the outside of the frame 12 of the motor 10.

Alternatively, as illustrated in FIG. 3, three heat insulation channels 40 of the primary cooling circuit 20 at least surround a second cooling channel 34 for efficiently discharging the heat energy, transmitted from the second cooling channel 34 to the outside of the frame 12 of the motor 10. Thus, the cooling of the motor 10, in particular of the rotor 14 is increased. This gives the possibility of increasing the performance level of the motor 10, while guaranteeing optimum, efficient and simple cooling.

The three heat insulation channels 40 form a heat barrier around the second cooling channel 34. The cooling of the internal gas fluid Fl going through the second cooling channel 34 of the secondary cooling circuit 30 is therefore improved.

It will be noted that the invention is not limited to the embodiments described earlier, but may have diverse alternatives.

In particular, the primary cooling circuit 20 communicating with the outside may include several primary conduits 26 positioned at the periphery of the stator 16 in order to increase the cooling of the latter.

Moreover, the second cooling channels 34 of the inner secondary cooling circuit 30 may be grouped, in at least one peripheral portion between the edge of the stator 16 and the primary circuit 20 communicating with the outside. Thus, it is simpler to separate the second cooling channels 34 of the secondary cooling circuit 32 with a heat insulation channel 40 of the primary conduits 26 of the primary cooling circuit 20.

It is also possible that the primary cooling circuit 20 and the secondary cooling circuit 30 comprise a plurality of channels.

The electric motor 10 may be used in any industrial field, in particular in the field of transportation vehicles, and more particularly railway vehicles.

The invention claimed is:

1. An electric motor, comprising:

a frame defining an internal volume and comprising:
- a rotor and a stator positioned in the internal volume of the frame,
- a primary cooling circuit comprising at least one primary conduit going through the internal volume of the frame and in fluidic communication with the outside of the frame in order to circulate a gas coming from the outside of the frame into the internal volume of the frame,
- a secondary cooling circuit extending in the internal volume of the frame and isolated from the outside of the frame, said secondary cooling circuit comprising at least one first cooling channel going through the rotor and at least one second cooling channel going through the stator,
- at least one heat insulation channel interposed between the primary conduit of the primary cooling circuit and the second cooling channel of the secondary cooling circuit;

wherein:
- the primary conduit goes through the stator;
- the heat insulation channel forms a heat barrier between the primary conduit and the second cooling channel of the secondary cooling circuit; and
- the first cooling channel and the second cooling channel form a closed circuit and are in fluidic communication.

2. The electric motor according to claim 1, wherein the heat insulation channel belongs to the primary cooling circuit.

3. The electric motor according to claim 1, wherein the heat insulation channel belongs to the inner secondary cooling circuit.

4. The electric motor according to claim 1, wherein the heat insulation channel at least partly surrounds at least the second cooling channel of the inner secondary cooling circuit.

5. The electric motor according to claim 1, wherein the heat insulation channel is laid out as a blade and has a thickness perpendicular to an axis of rotation of less than the diameter of the primary conduit of the primary cooling circuit and the diameter of the second cooling channel of the secondary cooling circuit.

6. The electric motor according to claim 1, wherein a radial fan is mounted on the shaft of the electric motor for accelerating a gas flow in the secondary cooling circuit.

7. The electric motor according to claim 6, wherein the radial fan allows simultaneous acceleration of a gas flow in the primary cooling circuit and a gas flow in the secondary cooling circuit.

8. The electric motor according to claim 1, wherein the primary cooling circuit communicating with the outside includes several primary conduits positioned at a periphery of the stator.

9. The electric motor according to claim 1, wherein the secondary cooling circuit comprises several second cooling channels, said second cooling channels being grouped in at least one peripheral portion between an end of the stator and the primary cooling circuit communicating with the outside.

10. The electric motor according to claim 1, wherein the primary cooling circuit and the secondary cooling circuit comprise a plurality of channels.

* * * * *